(12) United States Patent
Heller et al.

(10) Patent No.: US 9,974,116 B2
(45) Date of Patent: *May 15, 2018

(54) HANDOFF TO BASE STATION HAVING ENHANCED CAPABILITIES

(75) Inventors: Howard A. Heller, Indialantic, FL (US); Kevin L. Farley, Orlando, FL (US); James A. Proctor, Jr., Indialantic, FL (US)

(73) Assignee: IPR LICENSING, INC., Wilmington, DE (US)

( * ) Notice: Subject to any disclaimer, the term of this patent is extended or adjusted under 35 U.S.C. 154(b) by 74 days.

This patent is subject to a terminal disclaimer.

(21) Appl. No.: 13/559,212

(22) Filed: Jul. 26, 2012

(65) Prior Publication Data

US 2012/0289234 A1 Nov. 15, 2012

Related U.S. Application Data

(63) Continuation of application No. 09/871,154, filed on May 31, 2001, now Pat. No. 8,238,912.

(51) Int. Cl.
*H04W 36/00* (2009.01)
*H04W 48/04* (2009.01)
(Continued)

(52) U.S. Cl.
CPC .............. *H04W 99/00* (2013.01); *H04W 8/18* (2013.01); *H04W 76/02* (2013.01)

(58) Field of Classification Search
CPC ..... H04W 36/00; H04W 64/00; H04W 99/00; H04W 36/22; H04W 88/06; H04W 36/14;
(Continued)

(56) References Cited

U.S. PATENT DOCUMENTS 6,044,271 A 3/2000 Findikli
6,246,875 B1 6/2001 Seazholtz et al.
(Continued)

OTHER PUBLICATIONS

Cong et al., "The Definitions of Managed Objects for IP Mobility Support using SMIv2," Network Working Group, RFC 2006: 1-52 (Oct. 1996).

(Continued)

*Primary Examiner* — Khawar Iqbal
(74) *Attorney, Agent, or Firm* — Volpe and Koenig, P.C.

(57) ABSTRACT

A method and a wireless transmit/receive unit perform a handoff to a target base station having enhanced capabilities. A dual mode manager triggers a capabilities query for information regarding enhanced capability of the target base station, wherein the enhanced capability includes transmission in accordance with a high speed data mode. A generator sends the query to a server connected to the Internet via a first base station not having enhanced capability. The dual mode manager receives from the server via the first base station information regarding the enhanced capability. A handoff to the target base station is initiated by the dual mode manager on a condition that the received information indicates that the target base station has enhanced capability. The dual mode manager deactivates a first mode of operation for communication with the first base station and activates the high speed data mode for communication with the target base station.

5 Claims, 3 Drawing Sheets

(51) Int. Cl.
*H04W 76/02* (2009.01)
*H04W 99/00* (2009.01)
*H04W 8/18* (2009.01)

(58) Field of Classification Search
CPC ..... H04W 36/38; H04W 36/30; H04W 48/04; G06Q 20/04; G06Q 20/32; G06Q 20/325; G06Q 20/327; H04L 63/0272; H04L 63/08
USPC ........ 455/410–411, 418–419, 436, 440–449, 455/452, 456.1–456.6
See application file for complete search history.

(56) References Cited

U.S. PATENT DOCUMENTS

| | | | |
|---|---|---|---|
| 6,438,117 B1* | 8/2002 | Grilli | H04W 36/0083 370/331 |
| 6,505,043 B1* | 1/2003 | Aihara | 455/436 |
| 6,591,116 B1 | 7/2003 | Laurila et al. | |
| 6,600,917 B1 | 7/2003 | Maupin | |
| 6,625,467 B2* | 9/2003 | New | H04W 48/16 370/332 |
| 6,751,459 B1 | 6/2004 | Lee et al. | |
| 6,925,074 B1 | 8/2005 | Vikberg et al. | |
| 7,006,479 B1 | 2/2006 | Joo et al. | |
| 7,035,932 B1 | 4/2006 | Dowling | |
| 7,058,076 B1 | 6/2006 | Jiang | |
| 7,072,656 B2* | 7/2006 | Willars | H04W 36/0061 370/331 |
| 7,136,368 B2 | 11/2006 | Inoue | |
| 7,233,797 B2* | 6/2007 | Kanagawa | H04W 16/14 370/331 |
| 7,251,489 B2 | 7/2007 | Beasley et al. | |
| 7,257,404 B1* | 8/2007 | Chow | H04W 36/0083 370/331 |
| 7,890,099 B2* | 2/2011 | Mohammed | H04L 63/083 455/432.1 |
| 2001/0005178 A1* | 6/2001 | Stewart | 342/457 |
| 2002/0045446 A1 | 4/2002 | Peters | |
| 2002/0065099 A1 | 5/2002 | Bjorndahl | |
| 2002/0068570 A1 | 6/2002 | Abrol et al. | |
| 2002/0077140 A1* | 6/2002 | Monogioudis | H04W 52/40 455/522 |
| 2002/0102974 A1 | 8/2002 | Raith | |
| 2002/0111169 A1* | 8/2002 | Vanghi | H04W 76/025 455/436 |
| 2002/0122396 A1* | 9/2002 | Terasawa | H04W 36/18 370/331 |
| 2002/0141358 A1 | 10/2002 | Requena | |
| 2002/0147008 A1 | 10/2002 | Kallio | |
| 2002/0168980 A1* | 11/2002 | Gwon | H04W 36/0016 455/437 |
| 2003/0013451 A1* | 1/2003 | Walton | H04W 16/04 455/447 |
| 2004/0152482 A1* | 8/2004 | Raffel | H04W 16/16 455/522 |
| 2005/0048969 A1 | 3/2005 | Shaheen et al. | |
| 2005/0059390 A1 | 3/2005 | Sayers et al. | |
| 2005/0198199 A1* | 9/2005 | Dowling | 709/217 |
| 2005/0207395 A1* | 9/2005 | Mohammed | 370/352 |
| 2005/0239453 A1 | 10/2005 | Vikberg et al. | |
| 2006/0030309 A1* | 2/2006 | Lee | H04W 36/12 455/422.1 |
| 2006/0114889 A1 | 6/2006 | Schneider et al. | |
| 2007/0129072 A1 | 6/2007 | Yamato et al. | |
| 2007/0202877 A1 | 8/2007 | Hogan | |
| 2016/0043992 A1* | 2/2016 | Henry | H04W 88/182 709/245 |

OTHER PUBLICATIONS

Montenegro, "Reverse Tunneling for Mobile IP," Network Working Group, RFC 2344: 1-19 (May 1998).
Perkins, "IP Encapsulation within IP," Network Working Group, RFC 2003: 1-14 (Oct. 1996).
Perkins, "IP Mobility Support," Network Working Group, RFC 2002: 1-79 (Oct. 1996).
Perkins, "Minimal Encapsulation within IP," Network Working Group, RFC 2004: 1-6 (Oct. 1996).
Solomon, "Applicability Statemetn for IP Mobility Support," Network Working Group, RFC 2005: 1-5 (Oct. 1996).

* cited by examiner

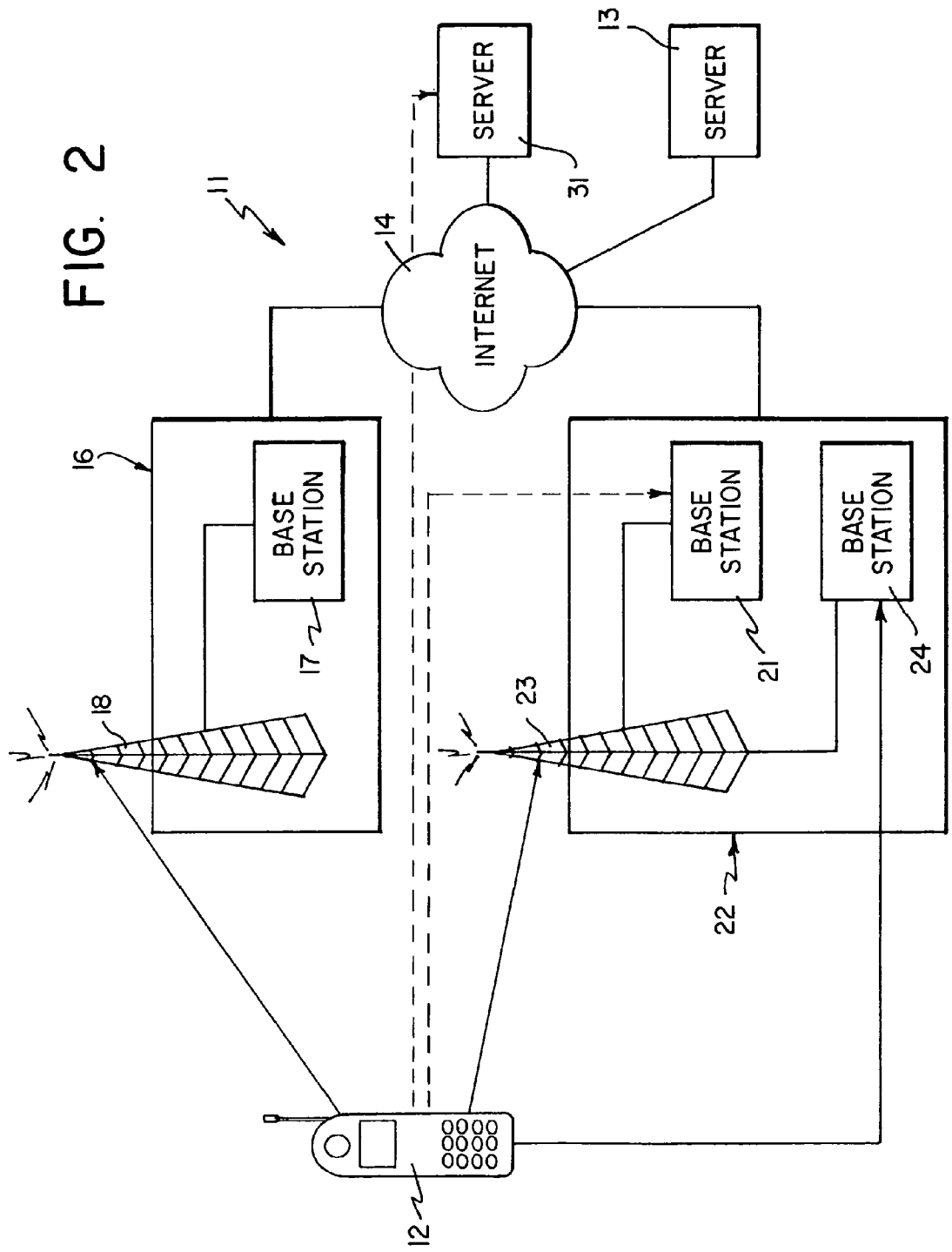

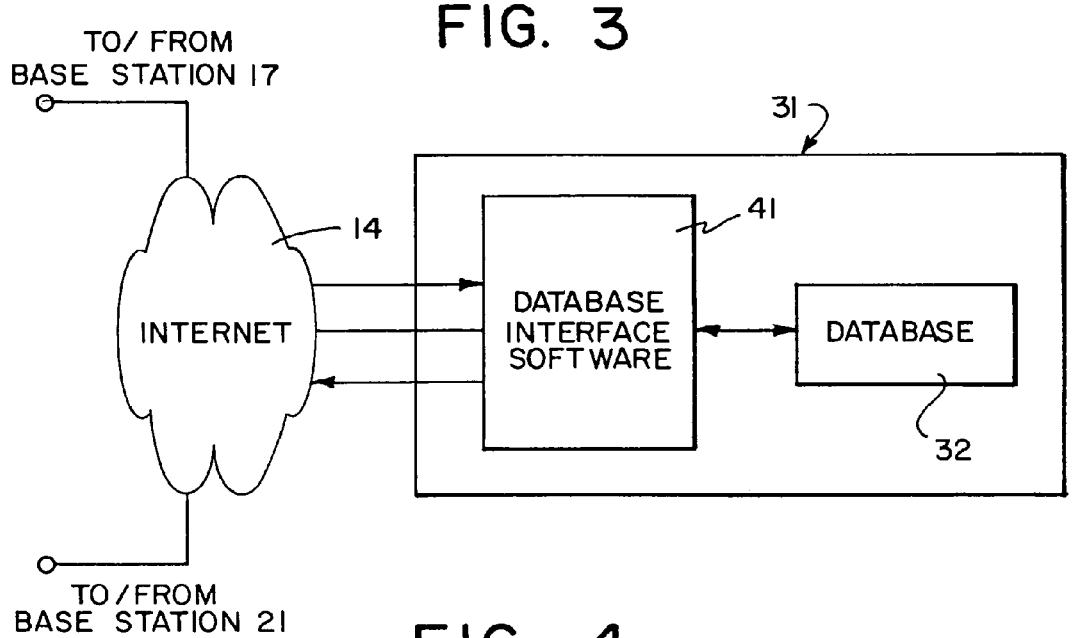
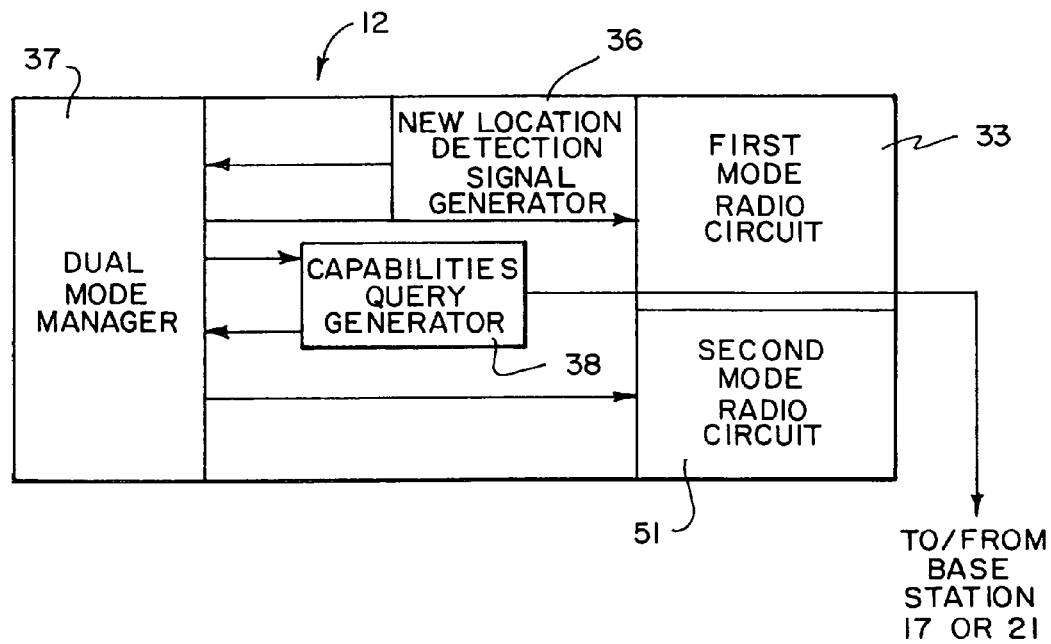

HANDOFF TO BASE STATION HAVING ENHANCED CAPABILITIES

CROSS REFERENCE TO RELATED APPLICATION

This application is a continuation of U.S. patent application Ser. No. 09/871,154, filed May 31, 2001, now U.S. Pat. No. 8,238,912, which is incorporated by reference as if fully set forth.

BACKGROUND OF THE INVENTION

This invention relates to data communication systems employing wireless subsystems and more particularly to arrangements for indicating enhanced capabilities of such subsystems to wireless handsets seeking access to those capabilities via such subsystems.

In order for wireless handsets to establish a transmission path to a desired destination through a data communication system having a wireless subsystem(s), it is necessary for the wireless facilities to exchange signaling information with the handset. In the usual case where the subsystem has a base station equipped to operate in a first mode employing voice or low speed data communications ("first mode"), specific first mode signaling is used to establish the connection when the wireless handset also operates in such first mode.

Dual mode wireless handsets are now available that can selectively operate either in such first mode or in a second mode that can support an enhanced capability such as transmitting and receiving high speed data messages over a wireless subsystem that has corresponding high-speed capability. This is advantageous, for example, where a dual mode handset that is initially connected in the first mode with a low-speed first base station at one cellsite is handed off to a second base station that is disposed at a second cellsite and that is collocated with a third base station capable of transmitting high speed data in the second mode. In such case, the handset can be switched into the second mode in response to signals indicative of the enhanced capability of the third base station. However, upgrading an existing base station by adding facilities to provide such enhanced signaling to a dual-mode handset can add significantly to the costs of setting up and operating the associated wireless subsystem.

SUMMARY OF THE INVENTION

The present invention provides a more advantageous arrangement for signaling base station enhanced capabilities and associated configuration data to a dual-mode wireless handset. In an illustrative embodiment applicable to the above-mentioned handoff from the first base station to the second base station, the handset is connected through the first base station to a first server that is designated as a first Internet destination port for the handset. A separate capabilities server is designated as a second Internet destination port. The capabilities server includes a data base populated with information indicative of, e.g., enhanced capabilities present at the cellsite location of the second base station. The handset is equipped with means for generating a suitable query message which is transmitted to the data base over the second base station in the first mode after a successful handoff to retrieve the capability information for the cellsite location of the second base station. The handset further includes means which, in response to the retrieved capability information, switches the handset from the first mode to the second mode for post-handoff operation with the enhanced capability facilities (e.g., a third base station) collocated with the second base station if the retrieved capability information indicates that the third base station can operate in the second mode.

BRIEF DESCRIPTION OF THE DRAWING

The invention is further illustrated in the following detailed description taken in conjunction with the appended drawing, in which:

FIG. 2 is a block diagram illustrating the wireless data communication system of FIG. 1 after incorporation of a separate capabilities server included in one embodiment of the signaling arrangement of the invention;

FIG. 3 is a block diagram of one embodiment of the capabilities server of FIG. 2; and FIG. 4 is s block diagram of one embodiment of dual-mode handset equipped to work with the capabilities server of FIG. 3 in implementing the signaling arrangement of the invention.

DETAILED DESCRIPTION

Figure 1:
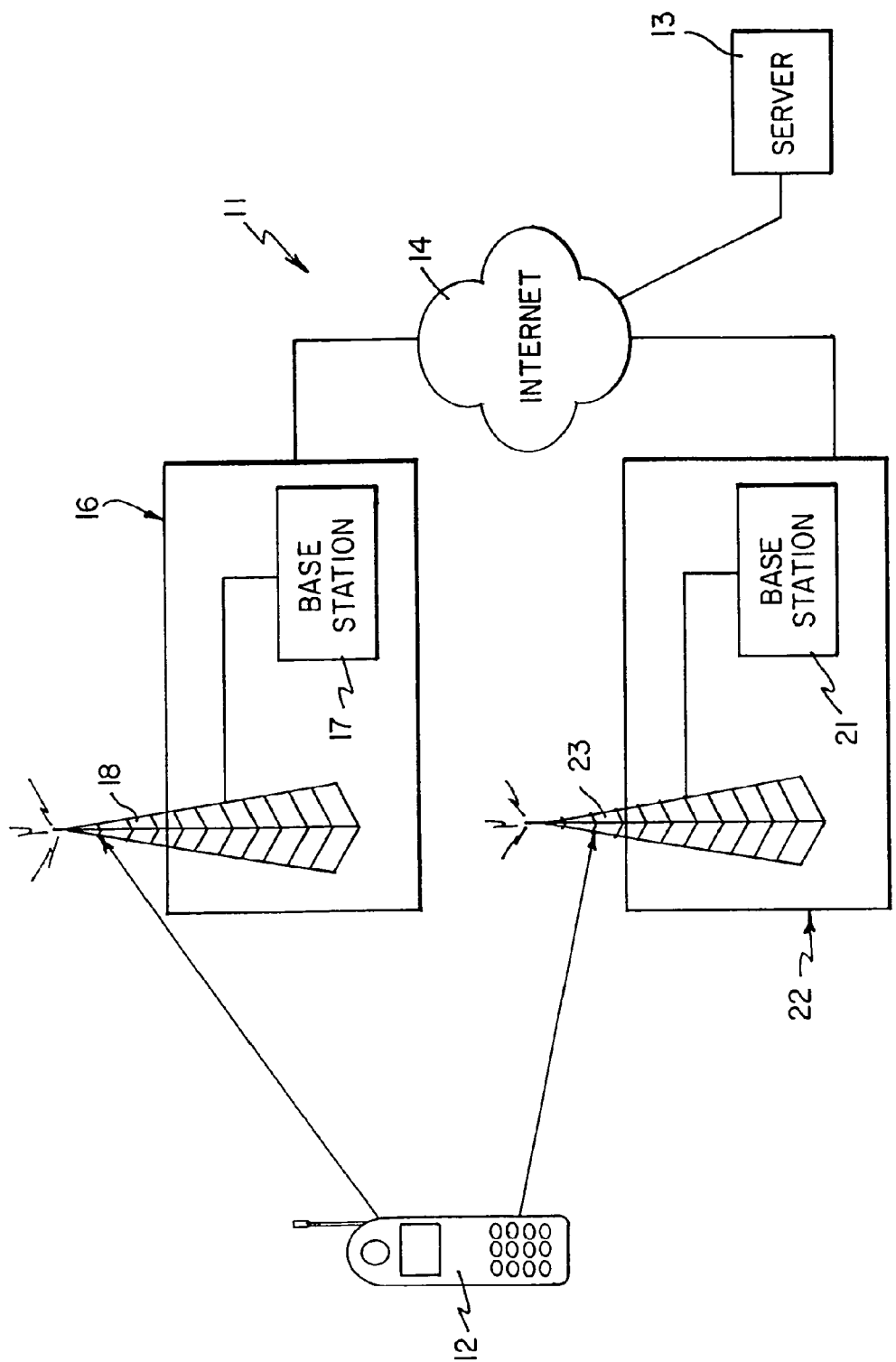
FIG. 1 is a block diagram of a wireless data communication system in which the data capability signaling arrangement of the invention may be incorporated.

Referring to the drawing, FIG. 1 depicts an illustrative embodiment of a data communication system 11 for transmitting data packets over a connection conventionally established between a wireless handset 12 and a server 13. The server is shown connected to the Internet represented at 14, and the server 13 is assigned an address that forms a remote destination port on the Internet for data from the handset 12.

The system 11 includes a first wireless subsystem 16 which, for purposes of this description, selectively provides wireless service to the handset 12. The first subsystem 16 defines a first cellsite that includes a base station 17. The base station 17 is supported in a radio tower 18. The base station 17 is assumed to be initially in radio communication with the handset 12. The subsystem 16 is coupled to the server 13 through a conventional wired network that includes the Internet 14.

The handset 12 may be switched, or handed off, from the then-connected base station 17 in the wireless subsystem 16 to a base station 21 in a second wireless subsystem 22 that defines a second cellsite. The base station 21 is supported in a radio tower 23. The handoff is accomplished in a conventional manner in accordance with the relative strength of a beacon or pilot signal transmitted to the handset 12 from the respective base stations 17 and 21. In particular, if the signal strength from the base station 21 as measured at the handset 12 is determined to be sufficiently greater than that of the base station 17 for more than a certain period of time, the handset may request a handoff from the base station 17 to the base station 21. For this purpose, the handset 12 generates a handoff request signal which is thereafter executed by the base stations 17 and 21. Upon completion of such handoff, packets may be transmitted from the handset to the server 13, and vice versa, through the base station 21 and the Internet 14.

Most wireless subsystems of the type represented at 16 and 22 operate in a first low-speed voice/data mode. In like manner, at least older forms of wireless handsets also operate in such first mode, and the low-speed radio connections established between the handset and each of the associated wireless subsystems are implemented, in part, by signaling from the applicable base station(s) in such subsystem to the handset. Conventionally, such signaling includes, among other things, an indication of data speed capability of the subsystem. Because of the widespread use of cellular technology employing such first mode, it has been common to utilize dedicated facilities in each base station to provide the required signaling for such low speed connections to the handset.

With the advance of technology, many networks like the system 11 are now enhanced with separate, colocated systems capable of high speed data transmission. Certain handset implementations, like the implementation described below in connection with FIG. 4, are equipped with facilities to selectively operate such handset in either the first low-speed voice/data mode or a second high-speed data mode. The availability of second mode operation of the handset, while enabling more efficient data transfer and exploitation of the higher transmission rates now available on many data networks, presents certain problems and complications in setting up the wireless connections for the transfer of data packets between the handset 12 and the server 13.

In particular, when both wireless subsystems 16 and 22 of FIG. 1 employ cellular technology exclusively in the first mode, they can utilize standard signaling facilities to establish low speed connections both before and after a handoff of the handset 12 between the affected base stations 17 and 21. However, if the subsystem 22 that is to receive the handoff is enhanced with facilities that can support the second mode (e.g., an additional enhanced base station 24 as represented in FIG. 2), it is necessary when such handoff takes place to signal the handset 12 that this cellsite location supports operation in the second mode. This is required so that the handset may be switched into its corresponding second mode of operation to take advantage of the enhanced data capabilities at the new location.

Unfortunately, the first mode base station 21 operates independent of the second mode base station 24 at the same location and therefore is not aware that the enhanced capability is available. In addition, the first mode base stations 17 and 21 have no such signaling method to notify the handset 12 of this enhanced capability. Upgrading the first mode base station signaling facilities to permit the signaling of the availability of the enhanced capability would greatly increase the operating costs of the wireless subsystem.

In accordance with the invention, a superior and more economical way is provided for implementing enhanced capability signaling to permit efficient connection of a wireless dual-mode handset to an associated wireless subsystem for operation in a selected one of the first and second modes. Illustratively, a capabilities server 31 (FIG. 2) is connected to the Internet 14 as a second destination port for the handset 12 through the system 11. Like the server 13, the capabilities server 31 is assumed to be initially accessible from the handset 12 through the low-speed base station 17 that is then in radio communication with the handset 12. The capabilities server 31 contains a data base 32 (FIG. 3) that is populated with capability data indicative of the enhanced capabilities (illustratively high speed data) present at cellsites within the system 11, including the cellsite represented by the wireless subsystem 22.

The manner in which the dual mode handset 12 may access the necessary connection data from the data base 32 in connection with a handoff of such handset from the base station 17 to the base station 21 will now be explained in connection with FIGS. 2-4. It will be assumed, as in FIG. 1, that an initial low speed (first mode) wireless connection is established between the handset and the base station 17 using first mode data capability resident in dedicated facilities in the base station 17. Such connection may extend between a suitable transceiver (not shown) in the base station 17 and a conventional first mode radio circuit 33 (FIG. 4) in the handset 12.

In response to a sufficient degree and duration of signal strength difference between the base stations 17 and 21, a handoff occurs in a conventional manner utilizing the existing first mode signaling. Upon completion of such handoff, a new location detection signal from a generator 36 in the handset 12 is applied to a dual-mode manager 37 in the handset. The dual-mode manager 37 triggers a capabilities query generator 38 whose content constitutes a request to the data base 32 (FIG. 3) in the server 31 to retrieve capability information regarding the cellsite associated with the base station 21. Preferably, the content of the data base query message includes, e.g., the cellsite location to which the handset is presently coupled and the current specific latitude-longitude location of the handset itself.

The data base query is transmitted, via the new low speed connection to the base station 21 and the Internet 14, to the server 31 (FIG. 3), where it is applied through suitable data base interface software 41 to the data base 32. The retrieved capability data from the database 32 is transmitted back through the interface software 41, the Internet 14 and the base station 21 to radio circuit 33 (FIG. 4) in the handset 12, where it is coupled to the dual-mode manager 37.

If the capability data retrieved from the data base 31 indicates that the new cellsite where base station 21 is located includes enhanced facilities (e.g., the base station 24 that is operable in the second high-speed mode), the manager 37 disconnects the handset 12 from the base station 21 and connects it to the base station 24 in a conventional manner. In addition, the manager 37 deactivates the first mode radio circuit 33 and activates a second mode radio circuit 51 in the handset 12 to enable high speed operation over a new radio path through the third base station 24. (Advantageously, registration of the handset pursuant to standard Mobile IP protocols as described, e.g., in Internet RFC 2002 and associated documents would be useful in maintaining connectivity to the server 13 following the switching of the handset to the base station 24). The capability data necessary to establish a high speed data connection between the handset 12 and the base station 24 may be easily accessed from the handset 12 through the public infrastructure of the Internet without the complications and expense that would be necessary if such data were available only through dedicated signaling added to the existing first mode base stations 17 and 21.

Preferably, the data base 31 may further include configuration data including a listing of base stations that border the base station 21 as well as other suitable RF characteristics useful to implement connections to the wireless subsystem 22 in the second mode. An advantage of the present invention is that the above-mentioned handset facilities shown in FIG. 4 in connection with the set-up of a high speed connection with the wireless subsystems 16 and 22 can be implemented in software. Also, while the capabilities server 31 is represented in FIGS. 2-3 as being a destination port of the Internet, it can be located anywhere on the wired portion of the network 11 or indeed on any other network that is accessible from the handset 12.

It will be further appreciated that the advantages of the invention may be utilized in connection with base stations in a single wireless subsystem (e.g., the subsystem 22), without any external handoff between such subsystem and another subsystem such as that depicted at 16. In such case, signals from the handset may be used to query the database server 31 over the low-speed base station 21 of the wireless subsystem 22. An indication from the data base 32 of high speed data capability of the subsystem 22 can then be used by the handset 12 to initiate high speed data service through the base station 24.

It should also be noted that although the enhanced capability described herein is a high speed data capability, those skilled in the art will appreciate that the techniques described in this invention can also be used to signal any other type of enhanced capability operational at the cellsite location, for example, location tracking and location based applications.

In the foregoing, the invention has been described, in part, in connection with an exemplary embodiment thereof. Many variations and modifications will now occur to those skilled in the art. It is accordingly desired that the scope of the appended claims not be limited to or by the specific disclosure herein contained.

What is claimed is:

1. A first cellular base station comprising:
a transceiver operatively coupled to a processor, the transceiver and the processor configured to receive information from a wireless mobile device including an identifier of a nearby second cellular base station, wherein the first cellular base station is not aware of the second cellular base station, wherein the second cellular base station supports an enhanced high rate data radio access technology (RAT), wherein the first base station does not support the enhanced high rate data RAT and wherein the enhanced high rate data RAT includes an enhanced capability;
an interface operatively coupled to the processor, the interface and the processor configured, in response to the received information, to send a request to a server for information regarding the nearby second cellular base station;
the interface and the processor configured to receive information regarding the nearby second cellular base station; and
the transceiver and the processor configured to support a handover of the wireless mobile device or another wireless mobile device to the nearby second cellular base station based on the received information regarding the nearby second cellular base station.

2. The first cellular base station of claim 1, wherein the request is sent through the Internet to the server.

3. A method comprising:
receiving, by a first cellular base station, information from a wireless mobile device including an identifier of a nearby second cellular base station, wherein the first cellular base station is not aware of the nearby second cellular base station, wherein the second cellular base station supports an enhanced high rate data radio access technology (RAT), wherein the first base station does not support the enhanced high rate data RAT and wherein the enhanced high rate data RAT includes an enhanced capability;
in response to the received information, sending, by the first cellular base station, a request to a server for information regarding the nearby second cellular base station;
receiving, by the first cellular base station, information regarding the nearby second cellular base station; and
supporting, by the first cellular base station, a handover of the wireless mobile device or another wireless mobile device to the nearby second cellular base station based on the received information regarding the nearby second cellular base station.

4. The method of claim 3, wherein the nearby second cellular base station has enhanced capabilities with respect to the first cellular base station.

5. The method of claim 3, wherein the request is sent through the Internet to the server.

* * * * *